Aug. 30, 1949.　　　O. H. SCHADE　　　2,480,511
SCANNING CIRCUIT
Filed Sept. 29, 1944
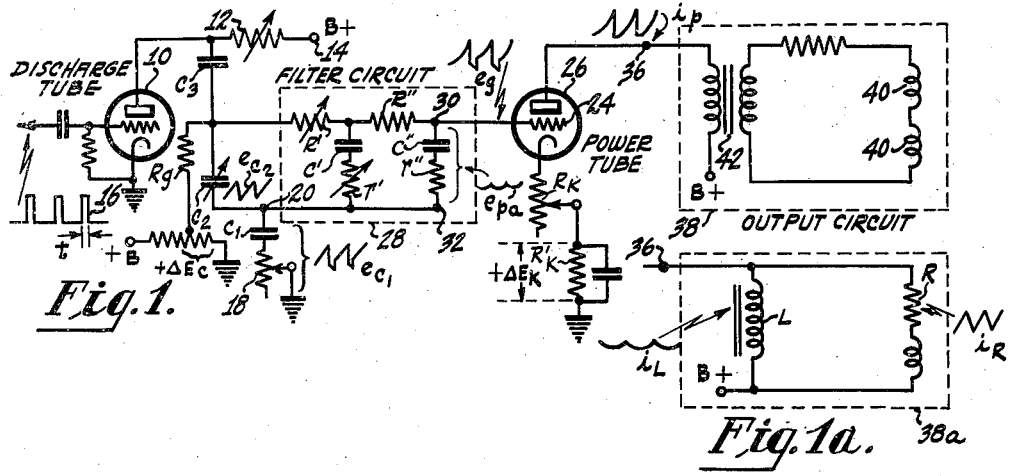
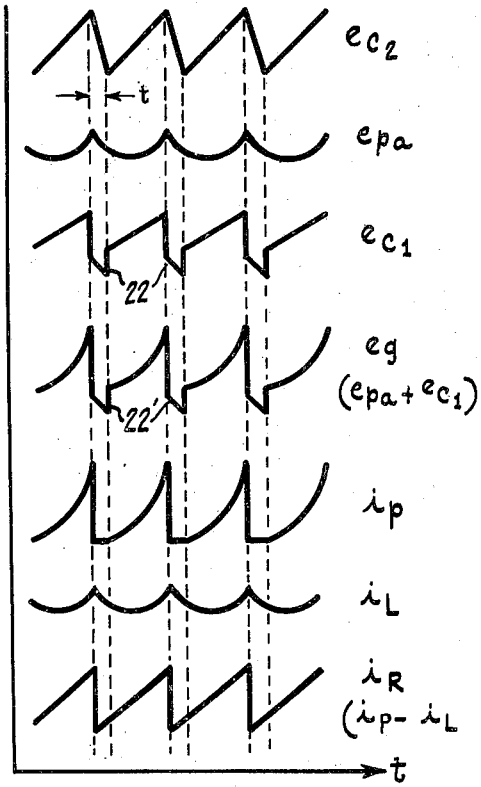
INVENTOR.
*Otto H. Schade*
BY *H. S. Grover.*
ATTORNEY Patented Aug. 30, 1949

2,480,511

UNITED STATES PATENT OFFICE 2,480,511

SCANNING CIRCUIT

Otto H. Schade, West Caldwell, N. J., assignor to Radio Corporation of America, a corporation of Delaware Application September 29, 1944, Serial No. 556,455

5 Claims. (Cl. 315—27)

The present invention relates to scanning circuits, and more particularly to circuits for obtaining saw-tooth currents of essentially constant slope.

In scanning it is necessary that the beam deflection increase linearly with time. When the magnetic method of scanning is employed, current through the deflection coils must be of constant saw-tooth slope. Any departure from a saw-tooth slope introduces distortion into the scanning process.

In a majority of cases, current for the deflection coils is obtained from an electron discharge device such, for example, as a power tube. To obtain the high current values necessary, as well as for correct impedance matching, the coils are often coupled to the anode of the tube through a transformer.

Under such conditions, if the current in the plate circuit of the tube is of saw-tooth shape, the deflection current through the coils will not be linear. This results from the fact that the deflection coils and transformer together form a parallel resistance-inductance combination, the shunt inductance being contributed wholly by the coupling transformer while the deflection coils offer substantially resistance alone. Although it is true that the deflection coils inherently have a certain amount of inductive reactance, at the frequencies under consideration (60 C. P. S. for example if the field deflection is being considered) this is of such small value that it may properly be disregarded. Since the magnetizing current through the transformer shunt does not change linearly as a result of voltage changes across the inductance, but is, instead, of substantially parabolic shape, subtraction of this current waveform passing through the inductance from the sawtooth plate current will leave a resultant current for the resistance, or deflection coil, portion of the circuit the waveform of which will not be linear with time.

Distortion in the scanning process, produced in the above manner may be corrected by determining the form of current wave that must be present in the plate circuit of the tube in order to produce a saw-tooth current through the resistance portion of the resistance-inductance combination, or in other words through the deflection coils. This desired plate current is found to be the algebraic sum of the currents through the resistive and inductive portions of the plate circuit. In other words, if a wave consisting of these components is applied to the resistance-inductance combination, a current of parabolic waveform will form through the inductance, leaving the linear saw-tooth component to flow through the resistance of the deflection coils.

The presence of such a composite current waveform in the plate circuit of the power tube requires that the waveform of the voltage applied to the grid of a distortionless amplifier shall have a similar shape. This may be done by generating two voltages, one having a saw-tooth configuration and the other having a parabolic waveform, these voltages having waveforms corresponding essentially to the waveforms of the current components through the resistance and inductance portions, respectively, of the output circuit. In other words, two individual components of a grid voltage wave are separately generated and combined into a composite control potential producing a composite output current of similar shape, the latter then being separated into two individual current components substantially similar respectively to the two voltage components originally generated.

The above may be accomplished conventionally by employing separate circuits to generate the two voltage components. By means of the present invention, however, I am able to generate both voltage components and in series in a single discharge circuit for direct application to a power tube grid.

Another factor that must be taken into consideration in deflection systems is that of linearity of amplification of the power tube. Even if the voltage wave on the grid thereof is of the proper shape to produce the two desired current components in the plate circuit, this result will not be achieved unless the composite plate current is substantially identical in form to the grid voltage over the operating range of the tube. In known systems employing several control stages intermediate the discharge circuit and the power tube, linearity of amplification is obtained by feeding back a voltage produced across a resistance by the deflection circuit to either the grid or cathode of one or more of these intermediate stages, this feedback voltage being of proper phase to produce degeneration and reduction of waveform distortion in the system but with a corresponding decrease in gain. Furthermore, when two or more tubes are employed intermediate the discharge circuit and power tube, and when such intermediate tubes are connected in conventional fashion to a common source of plate voltage, the common impedance of the plate voltage supply will tend to cause low-frequency oscillations known as "motorboating." The above may be overcome by using a large filter capacitance in the supply line. Random fluctuations, however, will still cause transients of long duration resulting in temporary displacement of the viewed image.

In the present invention, the voltage components which must be applied to the power tube grid in order to obtain the desired components of plate current are generated directly in the discharge tube circuit. This eliminates the necessity for employing feedback of the above nature in order to obtain linearity of operation of the power tube, such linearity of operation being instead accomplished by providing degeneration in the cathode circuit of the tube through the omission of the usual by-pass condenser.

One object of the present invention, therefore, is to provide means for obtaining beam deflection currents of essentially linear saw-tooth shape.

Another object of the invention is to provide means for overcoming the effects of inductive shunt reactance present in a deflection coil coupling circuit on the linearity of the current through the coil.

A further object of the invention is to determine the individual inductive and resistive components of the current in the plate circuit of a power tube supplying beam deflection coils, and to generate in series in a single discharge circuit voltage components having waveforms substantially similar to the current components, the sum of these voltage components then being applied to the power tube grid.

A still further object of the invention is to provide a system of the above nature that will be non-regenerative and therefore unaffected by random fluctuations in the power supply thereto.

An additional object of the invention is to provide, in a system of the above nature, simple and effective means for obtaining quick-acting amplitude control of the beam deflection currents.

Other objects and advantages will be apparent from the following description of a preferred form of the invention and from the drawings, in which:

Fig. 1 is a schematic illustration of a circuit incorporating the present invention;

Fig. 1a is a schematic illustration of a circuit portion which is substantially the electrical equivalent of a portion of the circuit of Fig. 1; and Fig. 2 is a set of waveforms useful in explaining the operation of the circuit of Fig. 1.

In Fig. 1 is illustrated a discharge tube 10 biased to cut-off. When tube 10 is non-conducting, current flows through an adjustable resistor 12 from a source of positive potential (not shown) connected to the terminal 14 to charge the series capacitors $C_1$, $C_2$, and $C_3$, of which $C_2$ is preferably adjustable. Before the capacitors have attained their full charge, however, one of a series of synchronizing pulses, such as these represented at 16 of duration T is applied to the grid of tube 10. The latter then becomes conductive effectively to short-circuit the capacitors. If resistor 12 is adjusted to be of relatively high value with reference to the repetition rate of the synchronizing pulses 16, the waveform $ec_2$ of Fig. 2 representing the potential change on capacitor C can be made substantially linear.

Between capacitor $C_1$ and ground there is provided an adjustable peaking resistor 18. The voltage developed across the combination of this peaking resistor 18 and capacitor $C_1$, or in other words between point 20 and ground, is represented by the waveform $ec_1$. Due to the sudden changes in voltage produced across resistor 18, the waveform $ec_1$ will have peaks 22 as shown in Fig. 2, being in effect a combination wave having both impulse and saw-tooth components. The magnitude of the peaks 22 may be varied by adjustment of resistor 18. The capacitor $C_3$ serves to block the B+ voltage appearing at terminal 14 from the grid 24 of power tube 26, the function of which will be later described.

The voltage $ec_2$ developed across capacitor $C_2$ is applied to a filter circuit 28. This filter circuit is in effect a two-section network, one section consisting of series resistor $R'$ together with shunt capacitor $C'$, while the other section consists of series resistor $R''$ together with shunt capacitor $C''$. The action of network 28 is to transform the saw-tooth voltage $ec_2$ into a voltage having a waveform $e_{pa}$ which is essentially parabolic in shape, as shown in Fig. 2. Either resistor $R'$ or $R''$ is preferably made adjustable to control the shaping of waveform $e_{pa}$. Auxiliary shaping control of the peaks of the parabolic waveform may be obtained by adjustment of one of a pair of peaking resistors $r'$, $r''$ respectively in series with capacitors $C'$, $C''$.

Voltage $e_{pa}$ appearing across the output terminals 30, 32 of filter circuit 28 is applied to grid 24 of power tube 26. This voltage $e_{pa}$ appearing across terminals 30, 32 is in series with the voltage $ec_1$ between point 20 and ground. Consequently the total voltage applied to grid 24 is the sum of voltage $e_{pa}$ and $ec_1$, this composite voltage being illustrated as $e_g$ in Fig. 2.

The non-linear waveform $e_g$ has a configuration dependent on the shape and relative magnitude of its components. The relative magnitude in turn depends in inverse proportion on the values of the capacitors $C_1$ and $C_2$. Since the voltage $ec_2$ is attenuated to a certain extent by the filter circuit 28, the relative capacities of $C_1$ and $C_2$ should be selected with this in mind.

In order that the plate current $i_p$ of tube 24 shall have a waveform which is essentially similar in configuration to that of the grid voltage $e_g$ at any amplitude value, the tube 26 must act as a linear amplifier. Furthermore, it should be cut-off during retrace time in order that a low tube impedance may not cause rounding off of the points of the saw-tooth current wave component of the output. The latter requirement is provided for by the presence of the peaks 22' in waveform $e_g$, these peaks 22' resulting from the presence of corresponding peaks 22 in voltage wave $ec_1$. Tube 26 may be so biased that the peaks 22' of voltage input $e_g$ are eliminated from the current output $i_p$, as illustrated in Fig. 2.

The requirement of linearity of amplification by tube 26 is met by providing degeneration in the cathode circuit of the tube, the customary cathode by-pass condenser being omitted. The amount of degeneration is controlled by varying the adjustable cathode resistor $R_k$. Adjustment of this resistor $R_k$ also provides an effective means for controlling the amplitude of the plate current which is represented by the wave $i_p$.

Since the impedance of the filter circuit 28 is relatively high, the grid leak $R_g$ should have a high value. This is permissible if the D.-C. degeneration of the power tube current in the cathode circuit of tube 26 is increased by adding a resistor $R'_k$. The excess bias $+\Delta E_k$ resulting from the use of $R'_k$ is compensated for in the grid circuit by returning $R_g$ to a bleeder voltage $+\Delta E_c$. This follows from the fact that the rated grid resistance value in a vacuum tube circuit may be increased by a factor $k$, provided that the D.-C.

degeneration in the cathode circuit, stated for use with the rated grid resistance, is increased by the same factor $k$, and further provided that the grid resistor is returned to a voltage $+\Delta E_c$ equal to the added cathode bias $+\Delta E_k$ so as to obtain the normal grid bias voltage.

The plate current $i_p$ appearing at point 36 in the output circuit of tube 26 is thus of substantially the same configuration as the voltage waveform $e_g$ applied to the grid 24, except that the bias on the tube is preferably so chosen that the peaks 22' of wave $e_g$ are not passed. Current wave $i_p$ is then applied to an output circuit 38, consisting in the example shown of a pair of beam deflection coils 40 associated with a cathode ray tube (not shown) and a coupling transformer 42. Obviously other types of output circuits having electrical characteristics substantially similar to those of the circuit illustrated may be employed in place thereof if desired.

The plate load of the power tube 26 at point 36 is essentially a resistance-inductance combination, consisting of the reflected resistance R of the deflection coils 40 and the parallel shunt reactance $X_L$ of a choke or transformer winding L. In other words, the circuit 38a of Fig. 1a is substantially the electrical equivalent of the output circuit 38 of Fig. 1, insofar as its appearance to an incoming current wave at point 36 is concerned.

The waveform of the current through L is parabolic, as shown in Fig. 2, and corresponds in configuration to the voltage waveform $e_{pa}$ appearing across the output terminals 30, 32 of the filter circuit 28. Since L and R are in parallel, the current through R is equal to the plate current $i_p$ at point 36 less the current $i_L$ through winding L. Accordingly, the current through R will have the waveform $i_R$, since at any instant $$i_R = i_p - i_L$$

It will be seen from Fig. 2 that the current $i_R$ has substantially the linear slope desired.

While it is true that the deflection coils 40 inherently possess inductive reactance, the magnitude of this reactance at the low frequencies to be employed in the preferred form of circuit illustrated (for example 60 C. P. S.) is so small that it may properly be disregarded for the purposes of this disclosure.

The waveform $i_R$ remains linear within the plate current range of the tube 26 and also with frequency as long as $X_L$ may be considered constant.

The shape of the parabolic voltage wave $e_{pa}$ depends on the time constant of the filter network 28. This time constant in turn depends on the relative values of R' and C'. Although exact determination of these relative values can best be accomplished by observing the scanning pattern, an approximation may be made by setting $$2R'C' = \frac{L}{R}$$

assuming R', C', and r' equal to R", C", and r", respectively. The relative amplitudes, as above mentioned, may be obtained by adjusting the capacity of $C_2$ with respect to $C_1$, since the voltage amplitude ratio of $e_{pa}$ to $e_{c_1}$ should be the same as the plate current amplitude ratio of $i_L$ to $i_R$.

In practice the waveforms $e_{c_1}$ and $e_{c_2}$ are usually not completely linear. The effect of this on the combined voltage $e_g$ is corrected by a corresponding increase in the parabolic voltage component $e_{pa}$.

While I have illustrated and described, and have pointed out in the annexed claims, certain novel features of my invention; it will be understood that various omissions, modifications and changes in the system illustrated may be made by those skilled in the art without departing from the spirit of the invention.

I claim:

1. In a system of the type in which current in the output circuit of a grid-controlled electron discharge device having an anode and a cathode and coupled to an essentially resistive load by a circuit possessing inductive reactance may be separated into components representing the current through the said resistive load and the inductively reactive portion of said coupling circuit, respectively, and in which a composite voltage is applied to the grid of said electron discharge device, said composite voltage being separable into individual voltages corresponding in waveform respectively to the said current components in said plate circuit, said electron discharge device being biased by means of a cathode resistor, the combination of a pair of series capacitors, means, including a source of current, for charging said capacitors, a grid-controlled discharge tube adapted to receive synchronizing signals on the grid thereof shunting said series capacitors, a shaping circuit in parallel with one of said capacitors, means for combining the voltage output of said shaping circuit and the voltage across the other of said capacitors for application to the grid of said electron discharge device, a supplementary cathode resistor for said electron discharge device, and means for supplying a positive D.-C. potential to the grid of said electron discharge device, said positive D.-C. potential being of such value as to compensate for the excess bias introduced by the employment of said supplementary cathode resistor.

2. In a cathode ray beam deflection system including electromagnetic deflection yoke having an inductive component and a resistive component, the combination of: a first electron discharge tube having at least an anode, a cathode, and a control electrode, an impedance connected from said anode to a positive voltage supply terminal, a first, second, and third charging capacitor connected in series between said first discharge tube anode and a point of fixed potential, a second electron discharge tube having at least an anode, a cathode, and a control electrode, means for coupling the electromagnetic deflection yoke to the anode-cathode circuit of said second electron discharge tube, a cathode impedance connected from said second electron discharge tube cathode to a point of fixed potential, a low-pass filter circuit connected in shunt with said second charging capacitor and also connected with said second electronic discharge tube control electrode, said low-pass filter circuit being adapted to present a direct current path from said second electron discharge tube control electrode and said second storage capacitor, a resistance connected from said second charging capacitor to a point of positive potential relative to the fixed potential termination of said second electron discharge tube cathode impedance such to bias said second electron discharge control electrode with said positive fixed potential, and a supplementary by-passed resistance connected in series with said second electron discharge tube cathode circuit to compensate for the positive potential bias applied to said second electron discharge control electrode.

3. Apparatus according to claim 2 wherein said low-pass filter connected in shunt with said second charging capacitor comprises a first and second resistance connected from the junction of said first charging capacitor and said second charging capacitor to said second electron discharge tube control electrode, a series capacitor and resistor connected from the junction of the first and second resistors to the junction of said second and third charging capacitors, and a series capacitor and resistor connected from said control electrode to the junction of said second and third charging capacitors.

4. Apparatus according to claim 2 wherein said low-pass filter connected in shunt with said second charging capacitor comprises a first and second resistance connected from the junction of said first charging capacitor and said second charging capacitor to said second electron discharge tube control electrode, a series capacitor and resistor connected from the junction of the first and second resistors to the junction of said second and third charging capacitors, and a series capacitor and resistor connected from said control electrode to the junction of said second and third charging capacitors and wherein said resistance connected from a source of positive fixed potential and said second charging capacitor is connected with the junction of said first charging capacitor and said second charging capacitor.

5. Apparatus according to claim 2 wherein there is provided a peaking resistor in series with the third charging capacitor and said point of reference potential.

OTTO H. SCHADE.

REFERENCES CITED

The following references are of record in the file of this patent:

UNITED STATES PATENTS

| Number | Name | Date |
|---|---|---|
| 2,179,607 | Bedford | Nov. 14, 1939 |
| 2,261,335 | Braden | Nov. 4, 1941 |
| 2,269,694 | Schade | Jan. 13, 1942 |
| 2,302,520 | Bingley | Nov. 17, 1942 |
| 2,365,575 | Maxwell | Dec. 19, 1944 |

FOREIGN PATENTS

| Number | Country | Date |
|---|---|---|
| 504,725 | Great Britain | Apr. 27, 1939 |